June 16, 1925.  1,542,040
D. S. DE LAVAUD
PAWL MECHANISM
Filed May 14, 1923
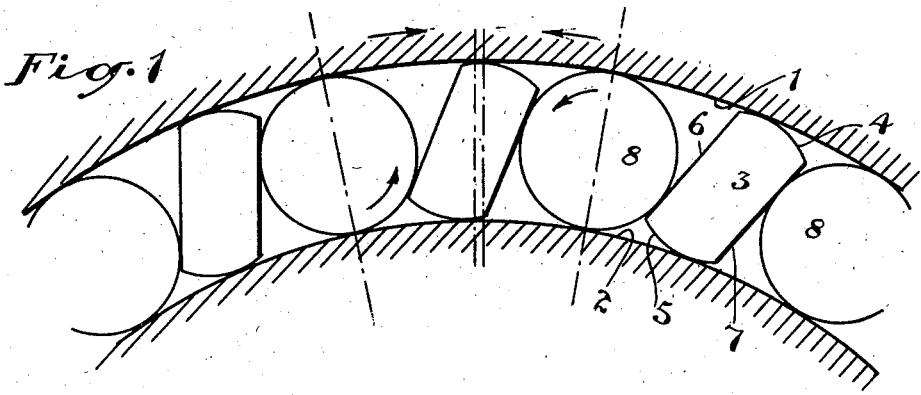
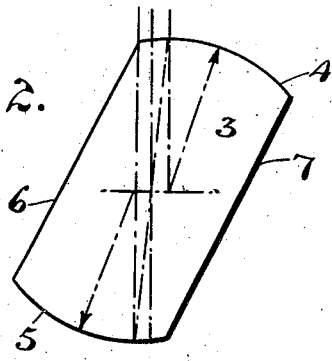
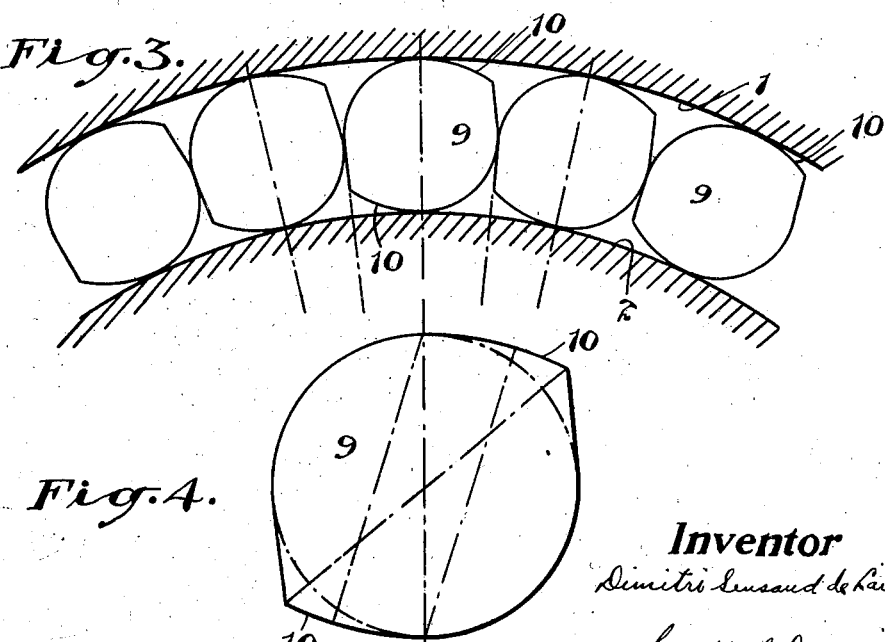
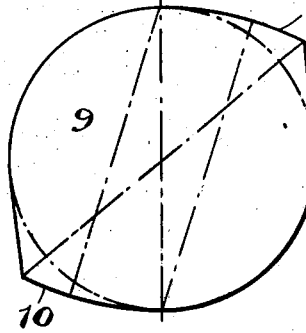
Inventor
Dimitri Sensaud de Lavaud Patented June 16, 1925.

1,542,040

UNITED STATES PATENT OFFICE.

DIMITRI SENSAUD DE LAVAUD, OF PARIS, FRANCE.

PAWL MECHANISM.

Application filed May 14, 1923. Serial No. 638,940.

*To all whom it may concern:*

Be it known that I, DIMITRI SENSAUD DE LAVAUD, a citizen of the United States of Brazil, and resident of the city of Paris, in the Republic of France, have invented certain new and useful Improvements in a Pawl Mechanism, described in the following specification and illustrated in the accompanying drawings, that form part of the same.

The principal objects of the invention are, to eliminate the expensive machining operations required in preparing special eccentric planes, and to produce a pawl system of driving mechanism which may be adapted at the minimum cost and may be applied to structures not specially constructed for that purpose.

The principal feature of the invention consists in the novel formation of members to be introduced between a pair of concentric surfaces having eccentrically curved surfaces adapted to engage the outer and inner members to effect a wedging frictional contact therewith.

In the accompanying drawings, Figure 1 is a sectional elevational view showing the application of the invention.

Figure 2 is an enlarged diagrammatic view illustrating the arranagement of the eccentric surfaces.

Figure 3 is a view similar to Figure 1 illustrating a modified application of the invention.

Figure 4 is an enlarged diagrammatic illustration of the elements shown in Figure 3.

It has been the custom in the past to form free wheel mechanisms by providing upon one member, in rotatable relation with another, a plurality of eccentrically disposed planes with which rollers or balls co-operate to bind the rotatable and rotated member together when turning in one direction, the balls being instantaneously freed upon the cessation of the rotative energy.

This invention proposes to accomplish a similar result with two continuously concentric surfaces 1 and 2 and the accomplishment of the invention is in providing prism members 3 with eccentrically disposed surfaces 4 and 5 which will bind between the two cylindrical surfaces rotating in one direction.

These eccentric members, in the form illustrated in Figures 1 and 2, comprise the prisms 3 having two plane faces 6 and 7 parallelly connected by cylindrical surfaces which are segments of a circumference symmetrical in relation to the centre of the section of the prism, but eccentric in relation to such centre, that is to say, the prisms are formed with two cylindrical surfaces whose centres are offset. These prisms are arranged with their cylindrical faces engaging the surfaces 1 and 2 and they are supported in this position by circular roller members 8 which engage the flat faces 6 and 7.

It will be evident that when the outer member 1, illustrated in Figure 1, is rotated to the left, the rotation of the rollers 8 press against the prisms pivoting them so that their eccentric surfaces 4 and 5 are pressed into engagement with the surfaces 1 and 2 and as the direction of the pivot is such that said surfaces tend to engage through their maximum radius, a positive engagement is effected between the eccentric surfaces of the prisms and the concentric surfaces of the members 1 and 2 and a very positive driving connection is established.

It will also be readily seen that the slightest reactionary movement of the member 1 or the cessation of the member 1 will cause the members 3 to swing in the opposite direction on their pivots, thus releasing the surfaces 1 or 2 as the case may be and effecting free rotation.

In Figures 3 and 4 the prisms 9 are of a self-supporting nature being substantially circular with eccentrically offset surfaces 10 which correspond with the surfaces 4 and 5 while the remaining portions correspond with the rollers 8, that is, the prisms are self-supporting and having the cylindrical surfaces to engage the contact surfaces 1 and 2 they perform the double function of roller and prism.

Two different arrangements of this invention are herein shown and described but it must be understood that other dispositions may be effected and it is evident from a knowledge of what has been accomplished in the holding of ball and roller bearings in place, that these roller prisms may be supported by an intermediary cage.

What I claim as my invention is:—

In a pawl mechanism, the combination with a pair of spaced concentric surfaces, of a plurality of prisms having parallel faces and cylindrical surfaces connecting said parallel faces and in eccentric relation to each other, and rollers arranged between said prisms and engaging the flat sides thereof and holding the curved surfaces in contact with the spaced concentric surfaces.

DIMITRI SENSAUD de LAVAUD.